INVENTOR.
Takaichi Mabuchi

June 17, 1969 TAKAICHI MABUCHI 3,450,908
ELECTRIC MOTOR FOR DIVERSE LOADS HAVING CYLINDRICAL
HOUSING, SWITCH, AND GEARS
Filed Aug. 28, 1967

INVENTOR.
Takaichi Mabuchi
BY
ATTYS.

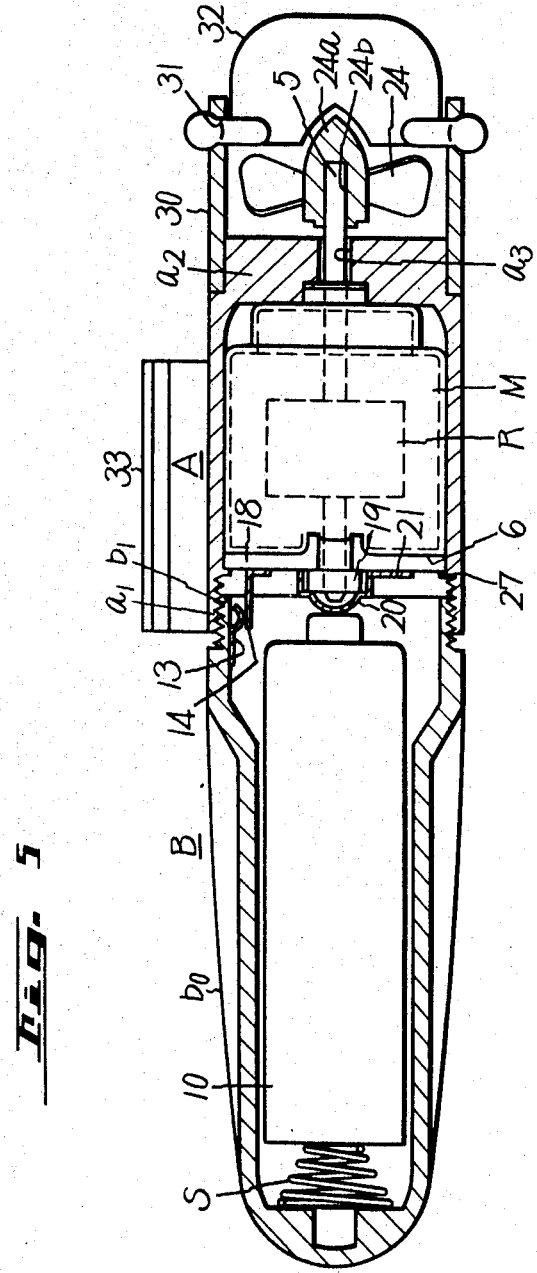

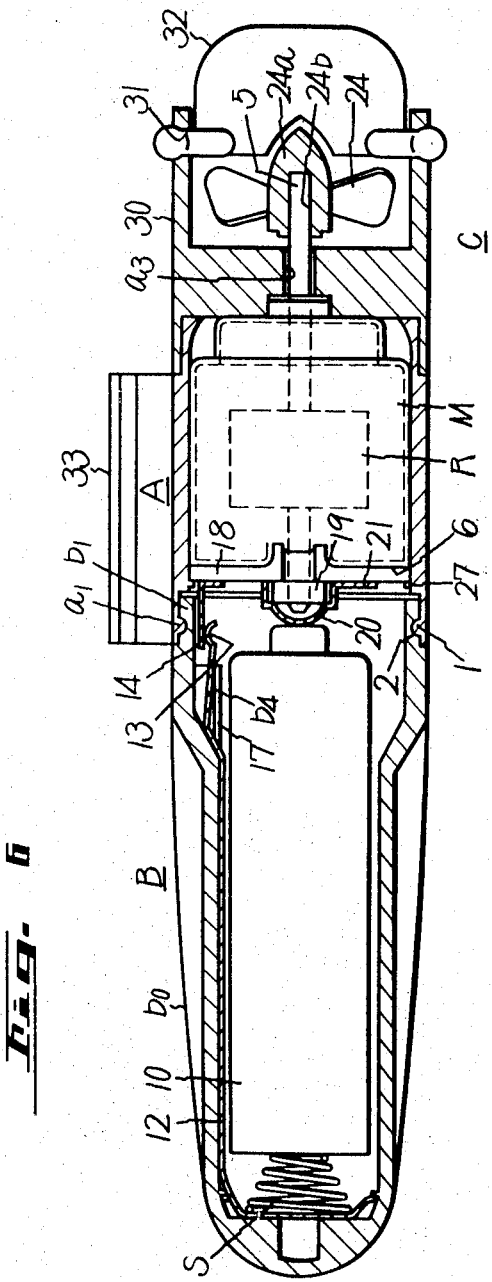

United States Patent Office 3,450,908
Patented June 17, 1969

3,450,908
ELECTRIC MOTOR FOR DIVERSE LOADS HAVING CYLINDRICAL HOUSING, SWITCH, AND GEARS
Takaichi Mabuchi, Tokyo, Japan, assignor to Tokyo Kagaku Kabushikikaisha, Tokyo, Japan, a corporation of Japan
Filed Aug. 28, 1967, Ser. No. 663,831
Claims priority, application Japan, Oct. 19, 1966, 41/97,182, 41/97,183, 41/97,184
Int. Cl. H02k 1/04, 1/06
U.S. Cl. 310—43      5 Claims

ABSTRACT OF THE DISCLOSURE

A motor-driving unit comprising a plurality of detachable cylindrical case members, a miniature motor, a power source battery housed in the case members, and a rotary member exchangeably mounted on the rotary shaft of the miniature motor projecting outside of the closure end of the end case member, and designed so that electrical connection between the miniature motor and the power source battery is switched on and off by the relative rotation of two of the case members to control the rotation of the motor without the provision of a switch on the outside of the cases members.

BACKGROUND OF THE INVENTION

Field of the invention

This invention relates to a motor-driving unit, and more particularly to a miniature motor-driving unit which is adapted so that a rotary member and its accessories can be detachably mounted on the rotary shaft of a miniature motor according to use and that the rotary member can be driven or stopped by the relative rotation of cylindrical case members enclosing therein the motor and a power source battery respectively.

Description of the prior art

Conventional types of motor-driving units employing a miniature motor have a rotary member affixed on the motor shaft and a manual switch for starting and stopping of the motor. In the past, no attempt has been made to mount any desired one of various rotary members on the motor shaft in a detachable manner according to particular use. Further, the conventional motor-driving units often go wrong with their switches.

SUMMARY OF THE INVENTION

One object of this invention is to provide a motor-driving unit which is designed to be readily assembled with a rotary member and its accessories.

Another object of this invention is to provide a motor-driving unit which is adapted to start and stop by the relative rotation of two cylindrical case members enclosing a miniature motor and a battery, to protect switch members and ensure accurate switching operation thereof.

Other objects, features and advantages of this invention will become apparent from the following description taken in conjunction with the accompanying drawings.

BRIEF DESCRIPTION OF THE DRAWING

FIGURES 5 and 6 are longitudinal cross-sectional views schematically illustrating other examples of the motor-driving unit of this invention.

DESCRIPTION OF THE PREFERRED EMBODIMENTS

Figure 1:
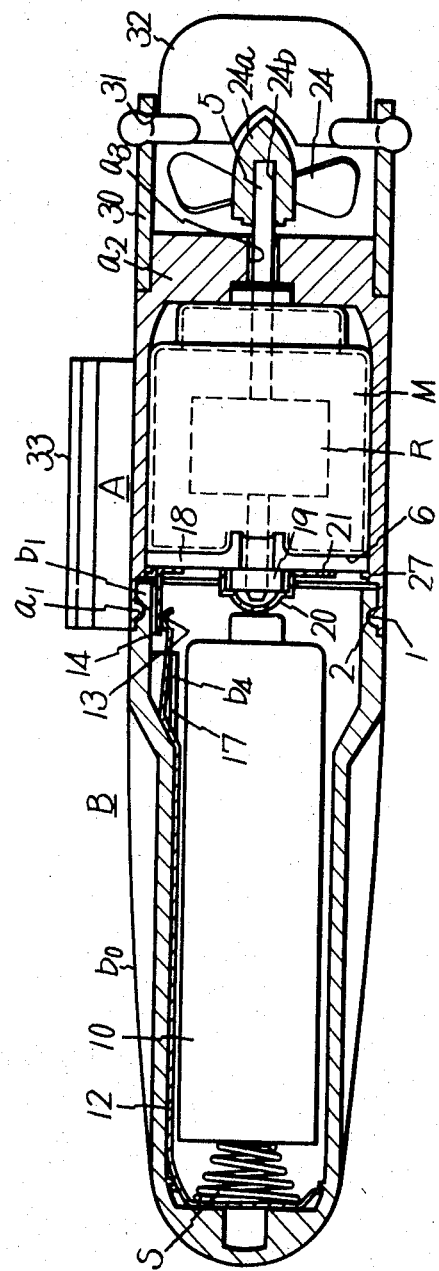
FIGURE 1 is a longitudinal cross-sectional view schematically illustrating one example of a motor-driving unit produced according to this invention.

With reference to the drawings the present invention will be described in detail. A motor-driving unit of this invention comprises first and second cylindrical plastic case members A and B having at open end portions thereof thin marginal portions $a_1$ and $b_1$ which are resiliently deformed to be engageable with each other so as to ensure assembling of the case members in a watertight manner. These engaging marginal portions are thinner than the major portions of the cylindrical case members, the thin marginal portion $a_1$ of the first case member A having a projecting flange 1 on the inside thereof, and the thin marginal portion $b_1$ of the second case member B having an annular groove 2 on the outside thereof for engagement with the projecting flange 1. The thin marginal portions $a_1$ and $b_1$ thus formed are forced into engagement with each other. Reference character $b_0$ indicates ribs formed longitudinally on the periphery of the second cylindrical plastic case member B integrally therewith, which ribs may be dispensed with.

The first cylindrical plastic case member A houses a miniature motor M, the rotary shaft 5 of which projects outside of a conical end portion $a_2$ of the case member through an aperture disposed centrally of the end portion $a_2$. Reference character R indicates a rotor of the motor M.

The second cylindrical plastic case member B encloses therein a battery 10, and a conductor 12 makes contact, at one end, with, for example, the negative electrode of the battery 10 through a coiled spring S and is led out in the vicinity of the marginal portion $b_1$ of the cylindrical plastic case member B along the inner wall thereof, providing a terminal 13. A terminal 14, connected to the miniature motor M, is located in the neighborhood of the thin marginal portion $a_1$ of the first cylindrical plastic case member A. With such an arrangement, the terminals 13 and 14 can be engaged with or disengaged from each other by turning the assembled first and second plastic case members A and B by hand. This avoids necessity of making special provisions for a switch for the power source circuit and a contact portion on the outside of the case members. That is, the device of this invention is designed so that the terminals 13 and 14 are engaged with or disengaged from each other by the relative rotation of the assembled plastic case members, maintained in a watertight manner, thereby switching the circuit on or off.

The following will describe the switching mechanism in detail. The conductor 12, making contact with the negative electrode of the battery 10 through the coiled spring S, is led out in the neighborhood of the marginal portion $b_1$ as above described. In this case, in order to hold the terminal 13 in position near the marginal portion of the second plastic case member B, a pair of projecting pieces $b_4$ are provided near the marginal portion $b_1$, defining a guide groove 17 to effectively prevent movement of the terminal 13 in the circumferential direction of the plastic case member B.

Meanwhile, the terminal 14, connected to the motor M through an insulation plate 18 for supporting the motor M, is positioned at such a location as to contact with the aforementioned terminal 13. That is, the relative arrangement of the terminal 14 to that of 13 is such that, by turning the first and second cylindrical plastic case members A and B by hand, the terminals 13 and 14 are engaged with each other to perform the function of a switch.

The motor supporting insulation plate 18 has a motor bearing 19 disposed centrally thereof, around which a conductor 20 is fitted, as illustrated in FIGURE 1. The conductor 20 has a conductive strip 21 leading to the motor M and constitutes a central terminal making contact with the positive electrode of the battery 10. This central terminal 21 is adapted to press the battery 10 against the coiled spring S provided on the inner wall $b_2$ of the end portion of the second cylindrical plastic case member B to ensure that the battery 10 is firmly held in position when the terminals 13 and 14 are engaged with or disengaged from each other by the relative rotation of the case members A and B.

As has been described in the foregoing, the motor M, the power source battery 10 for driving it and their connections are housed in the case members A and B, and the rotary shaft 5 of the rotor R of the motor M projects outside of the case member A as shown in FIGURE 1. Meanwhile, a ring-shaped projecting flange 27 is provided inside the engaging marginal portion $a_1$ of the case member A. When the motor M is inserted into the case member A, it is forcibly pushed into the case member A past the ring-shaped projecting flange 27 by the deformation of the engaging marginal portion $a_1$.

The motor-driving unit described above can be used with any desired rotary member, which is detachably mounted on the rotary shaft 5. With a screw propeller 24 attached to the rotary shaft 5, the motor-driving unit can be used with a toy ship. That is, the screw propeller 24 has a rubber or plastic piece 24 having a hole 24b, into which the rotary shaft 5 is inserted so as resiliently and detachably to mount thereon the screw propeller 24. Further, the first plastic case member A is designed such that a pair of arms 30 are fixedly attached to the closed end portion of the case member A, each arm having an aperture 31 at the projecting end, and a rudder 32 is disposed between the projecting arms 30, having its ends fitted into the apertures 31, in such a manner as to be frictionally rotatable.

The device of this invention is mounted on the toy ship through an attachment member provided on either one of the case members A and B. In the example shown in FIGURE 1 the first cylindrical plastic case member A has an attachment member 33 formed integrally therewith or separately thereof, on the outside, as depicted in the figure.

Figure 2:
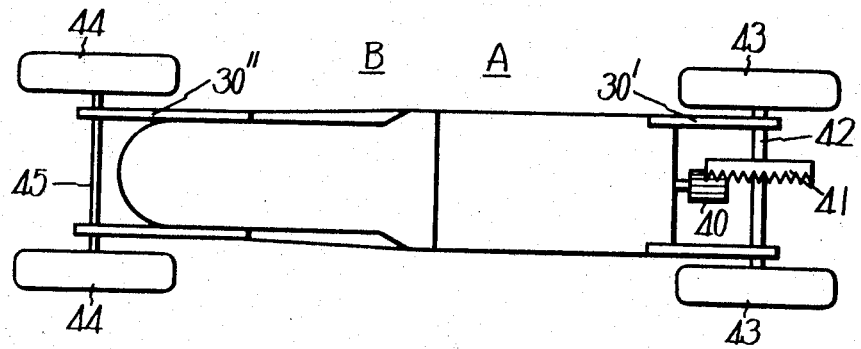
FIGURE 2 is a schematic diagram of the motor-driving unit of this invention as applied to a toy vehicle.

When the device of this invention is used with toy vehicles such as a toy car, a toy tank and so on, a pinion 40 is detachably mounted on the rotary shaft 5 in place of the screw propeller 24 and a crown gear 41 is ganged with the pinion 40 and wheels 43 are secured to the shaft 42 of the crown gear 41, as illustrated in FIGURE 2. In this case, the arms 30 having the rudder 32 are replaced with arms 30′ holding the shaft 42, and arms 30″ having front wheels 44 and a shaft 45 are detachably attached to the case member B in a similar manner. It is also possible to employ a frame for mounting the device of this invention on the toy vehicle, which frame is made separately of the device.

Figure 3:
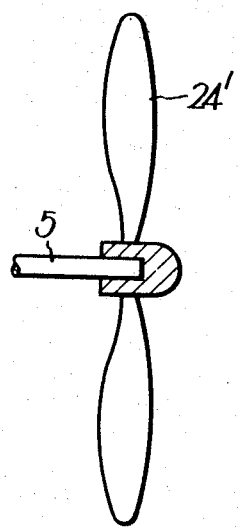
FIGURE 3 is a schematic diagram showing a fan blade of a portable fan, to which the motor-driving unit of this invention is applicable.

FIGURE 3 illustrates another example of this invention as applied to a miniature portable electric fan, in which a fan blade 24′ of a suitable size is secured to the shaft 5 in place of the screw propeller 24 shown in FIGURE 1. With a similar fan mounted on the shaft 5, the device of this invention can be applied to a toy monorail, a propeller ship or the like.

Figure 4:
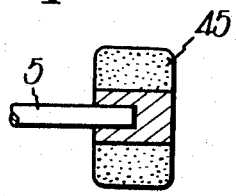
FIGURE 4 is a schematic diagram showing a piece for polishing of the nails in manicure.

FIGURE 4 illustrates another example of this invention as applied to polishing of the nails in manicure, in which a piece 45 for polishing the nails is mounted on the shaft 5.

Thus, this invention can be used for various purposes by replacement of various rotary members desired.

In FIGURE 5 there is illustrated a further modified form of this invention, in which a second cylindrical case member B is made of metal and is assembled with a first cylindrical case member A by threadably engaging marginal portions $b_1$ and $a_1$ of the two case members B and A. Since the second case member B is made of a metal, the conductor 12 shown in FIGURE 1 is unnecessary, but the motor M can be driven by the battery 10 through the terminal 13 fixed in the vicinity of the marginal portion $b_1$.

FIGURE 6 illustrates still another modification of this invention which comprises a first cylindrical case member A, a second cylindrical case member B and a closure end C assembled with the case member B, and the case members A and B are assembled together by resilient deformation of thin marginal portions of their open end portions as in the example shown in FIGURE 1. The motor M is inserted into the case member A from its open end portion and the closure end C is then assembled with the case member A, thus holding the motor M between the ring-shaped projecting flange 27 of the case member A and the inner wall of the closure end C. It will be seen that the rotary members such as shown in FIGURES 2 to 4 can also be exchangeably mounted on the shaft 5 in the examples illustrated in FIGURES 5 and 6.

It will be apparent that many modifications and variations may be effected without departing from the scope of the novel concepts of this invention.

I claim as my invention:

1. A motor-driving unit comprising at least first and second cylindrical case members having marginal portions adapted to be engaged with each other, a miniature motor housed in the first cylindrical case member, the rotary shaft of the miniature motor projecting out of the first cylindrical case member through an aperture disposed centrally of the end closure of the first cylindrical case member, a power source battery housed in the second cylindrical case member, battery connecting means consisting of a contact member connected with one electrode of the power source battery through a resilient conductive member and disposed near the marginal portion of the second cylindrical case member, another contact member connected with one terminal of the miniature motor and disposed near the marginal portion of the first cylindrical case member, and a conductor connected with the other terminal of the miniature motor and disposed centrally of an insulation plate of the miniature motor, the contact members being so disposed that they are engaged with each other at one relative rotational position of the first and second cylindrical case members and are disengaged from each other at other rotational positions, and the resilient conductive member pressing the other electrode of the power source battery into engagement with the conductor when the first and second cylindrical case members are assembled together, and a rotary member detachably mounted on the projecting end of the rotary shaft of the miniature motor.

2. A motor-driving unit comprising at least first and second cylindrical case members having marginal portions adapted to be engaged with each other, the first and second cylindrical case members being made of a plastic material, the marginal portion of the first cylindrical case member having a projecting flange and the marginal portion of the second cylindrical case member having an annular groove for engagement with the projecting flange, the marginal portions being resiliently deformed to be engageable with each other to assemble the first and second cylindrical case members, the first cylindrical case member having formed integrally therewith a ring-shaped projecting flange inside the marginal portion, a miniature motor housed in the first cylindrical case member, the rotary shaft of the miniature motor projecting out of the first cylindrical case member through an aperture disposed centrally of the end closure of the first cylindrical case member, the miniature motor and an insulation plate being resiliently pushed into the first cylindrical case member past the ring-shaped projecting flange by the deformation of the marginal portion of the first cylindrical case member and being held between the ring-shaped projecting flange and the end closure of the first cylindrical case member, a power source battery housed in the second cylindrical case member, battery connecting means consisting of a contact member connected with one electrode of the power source battery through a resilient conductive member and disposed near the marginal portion of the second cylindrical case member, another contact member connected with one terminal of the miniature motor and disposed near the marginal portion of the first cylindrical case member, and a conductor connected with the other terminal of the miniature motor and disposed centrally of the insulation plate of the miniature motor, the contact members being so disposed that they are engaged with each other at one relative rotational position of the first and second cylindrical case members and are disengaged from each other at other rotational positions, and the resilient conductive member pressing the other electrode of the power source battery into engagement with the conductor when the first and second cylindrical case members are assembled together, and a rotary member detachably mounted on the projecting end of the rotary shaft of the miniature motor.

3. A motor-driving unit comprising at least first and second cylindrical case members having marginal portions adapted to be engaged with each other, the first and second cylindrical case members being made of a plastic material and a metal material respectively, the marginal portion of the first cylindrical case member having a female screw and the marginal portion of the second cylindrical case member having a male screw for engagement with the female screw to assemble the first and second cylindrical case members, the first cylindrical case member having formed integrally therewith a ring-shaped projecting flange inside the female screw, a miniature motor housed in the first cylindrical case member, the rotary shaft of the miniature motor projecting out of the first cylindrical case member through an aperture disposed centrally of the end closure of the first cylindrical case member, the miniature motor and an insulation plate being resiliently pushed into the first cylindrical case member past the ring-shaped projecting flange by the deformation of the marginal portion of the first cylindrical case member and being held between the ring-shaped projecting flange and the end closure of the first cylindrical case member, a power source battery housed in the second cylindrical case member, battery connecting means consisting of a contact member connected with one electrode of the power source battery through a resilient conductive member and disposed near the marginal portion of the second cylindrical case member, another contact member connected with one terminal of the miniature motor and disposed near the marginal portion of the first cylindrical case member, and a conductor connected with the other terminal of the miniature motor and disposed centrally of an insulation plate of the miniature motor, the contact members being so disposed that they are engaged with each other at one relative rotational position of the first and second cylindrical case members and are disengaged from each other at other rotational positions, and the resilient conductive member pressing the other electrode of the power source battery into engagement with the conductor when the first and second cylindrical case members are assembled together, and a rotary member detachably mounted on the projecting end of the rotary shaft of the miniature motor.

4. A motor-driving unit comprising at least first and second cylindrical case members having marginal portions adapted to be engaged with each other, the first and second cylindrical case members being made of a plastic material, the marginal portion of the first cylindrical case member having a projecting flange, the marginal portion of the second cylindrical case member having an annular groove for engagement with the projecting flange, the marginal portions of the first and second cylindrical case members being resiliently deformed to be engageable with each other to assemble the first and second cylindrical case members, the first cylindrical case member having formed integrally therewith a ring-shaped projecting flange inside the marginal portion and including an end cover made of a plastic material, the end cover being detachably assembled with the first cylindrical case member on the opposite side from the second cylindrical case member, a miniature motor housed in the first cylindrical case member, the rotary shaft of the miniature motor projecting out of the first cylindrical case member through an aperture disposed centrally of the end cover of the first cylindrical case member, the miniature motor and an insulation plate being resiliently pushed into the first cylindrical case member past the ring-shaped projecting flange by the deformation of the marginal portion of the first cylindrical case member and being held between the ring-shaped projecting flange and the end cover of the first cylindrical case member, a power source battery housed in the second cylindrical case member, battery connecting means consisting of a contact member connected with one electrode of the power source battery through a resilient conductive member and disposed near the marginal portion of the second cylindrical case member, another contact member connected with one terminal of the miniature motor and disposed near the marginal portion of the first cylindrical case member, and a conductor connected with the other terminal of the miniature motor and disposed centrally of the insulation plate of the miniature motor, the contact members being so disposed that they are engaged with each other at one relative rotational position of the first and second cylindrical case members and are disengaged from each other at other rotational positions, and the resilient conductive member pressing the other electrode of the power source battery into engagement with the conductor when the first and second cylindrical case members are assembled together, and a rotary member detachably mounted on the projecting end of the rotary shaft of the miniature motor.

5. A motor-driving unit as claimed in claim 1 wherein the rotary member is a gear ganged with a crown gear mounted on a rotary shaft of a wheel unit.

References Cited

UNITED STATES PATENTS

| | | | |
|---|---|---|---|
| 1,893,261 | 1/1933 | Apple | 310—43 X |
| 2,079,356 | 5/1937 | Lukowski | 310—50 X |
| 3,152,272 | 10/1964 | Hovhanesian et al. | 310—83 |
| 3,375,381 | 3/1968 | Tavel | 310—81 |

WARREN E. RAY, *Primary Examiner.*

U.S. Cl. X.R.

46—91, 201; 115—17; 230—117; 310—50, 68, 83, 89